No. 750,044. PATENTED JAN. 19, 1904.
W. V. ALLEN.
HARVESTER THRESHER AND SEPARATOR.
APPLICATION FILED AUG. 20, 1903.
NO MODEL.
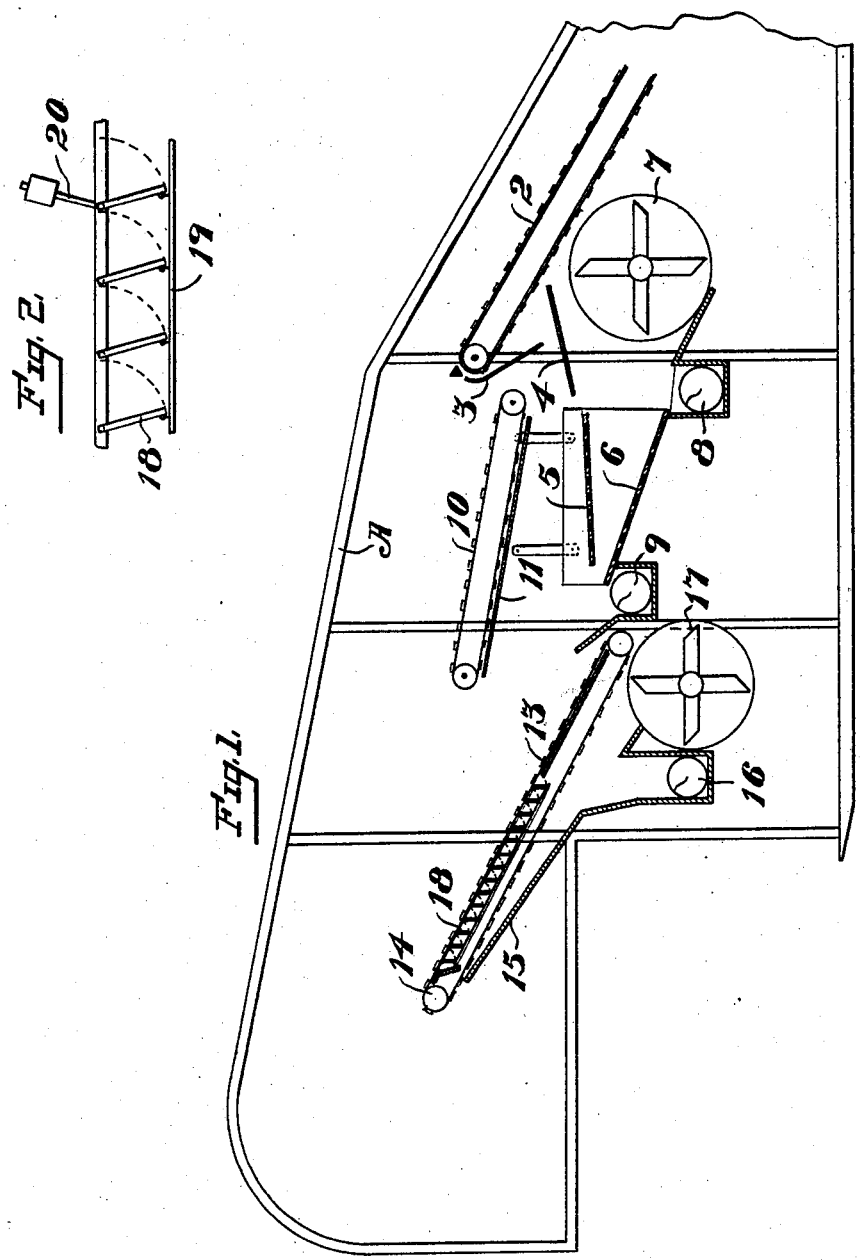
Witnesses,
Inventor,
William V. Allen
By Geo. H. Strong.
Atty No. 750,044. Patented January 19, 1904.

UNITED STATES PATENT OFFICE.

WILLIAM V. ALLEN, OF CHICO, CALIFORNIA.

HARVESTER THRESHER AND SEPARATOR.

SPECIFICATION forming part of Letters Patent No. 750,044, dated January 19, 1904.

Application filed August 20, 1903. Serial No. 170,132. (Model.)

*To all whom it may concern:*

Be it known that I, WILLIAM V. ALLEN, a citizen of the United States, residing at Chico, in the county of Butte and State of California, have invented new and useful Improvements in Harvester Threshers and Separators, of which the following is a specification.

My invention relates to improvements in apparatus in conjunction with harvester-threshers, and especially with that portion in which the grain and straw are separated from each other.

It consists in the employment of a supplemental straw-carrier extending beyond the usual main straw-carrier, so placed as to receive the discharge from said main carrier and having a series of turnable and adjustable direction-boards and a supplemental fan by which the blast of air is delivered between the main and supplemental straw-carriers and also through the spaces between the direction-boards. A closed bottom receives any grain which is thus separated from the passing straw and returns it to a supplemental auger located beyond the augers of the regular cleaning-shoe, and by means of the adjustable boards the strength and direction of the blast through and between them is regulated.

My invention also comprises details of construction which will be more fully explained by reference to the accompanying drawings, in which—

Figure 1 is a vertical section taken through the case, showing that portion of the apparatus to which my invention relates. Fig. 2 is a detail of adjustable slats and connections.

In the employment of threshing-machines either in connection with stationary or traveling harvesters the grain is first threshed and loosened from the heads. The mixed straw and grain is then carried up by an endless traveling belt and the straw loosened and separated by what are termed "beaters," so that most of the grain gradually falls through upon the carrying-belt and is delivered over the upper end and by suitable direction-boards is discharged so as to pass upon the cleaning-shoe, and it and the grain and straw are here subjected to the action of a fan-blower, which tends to blow away the chaff and to cause the straw to pass over upon a straw-carrier. From this carrier the straw is usually discharged upon the ground, and grain which may still be entangled with it is lost.

In my invention I employ a supplemental peculiarly-constructed and adjustable carrier with a second fan and means for further separating the grain from the straw and returning it, so that it may be saved.

As shown in the drawings, A represents the exterior case, within which the mechanism is contained.

2 is an endless traveling close-bottomed belt or "draper," as it is termed, upon which the straw is delivered from the threshing-cylinder, the latter not being here shown.

From the upper end of the traveling belt 2 the grain is carried over, and by means of a direction-board, as at 3, the grain is delivered upon the inclined surface 4, and from this it is discharged upon the upper screen 5 of the cleaning-shoe.

The screens 5 and 6 are disposed in the usual manner for threshing-machines, and the fan-blower 7, with a suitable discharge, provides a blast of air, which is intended to separate the chaff from the grain and discharge it over the rear end of the shoe. The grain passing down over the lower riddle 6 of the shoe is delivered into a transverse case in which revolves a spiral auger 8, and this delivers the grain to one side of the machine, from whence it may be taken to a second cleaning apparatus or sacked at the point of delivery. 9 is a similar auger located below the end of the cleaning-shoe and receiving any unthreshed heads of grain which may be carried over the end of the shoe and delivering it to a return-elevator in the usual manner.

The straw after leaving the carrier 2 passes over and falls upon what is known as the "straw-carrier" 10, which is an open slat belt, so that any grain which may still remain entangled with it will fall through this open belt during the progress of the straw from one end to the other and will be received upon an inclined bottom 11, over which it is returned by the return movement of the lower part of the belt and delivered upon the upper riddle of the cleaning-shoe. Even this apparatus is not always sufficient to entirely separate the grain from the straw, and more or less of it may be lost by falling upon the ground with the straw as it leaves the carrier 10.

In my invention I have shown a third straw-carrier 13, standing at an incline and located with its lower end beneath and underlapping the discharge end of the straw-carrier 10 and below the tail-board at rear of the shoe. This carrier 13 is also an open-slat belt passing over drums, as at 14, so that the upper part serves to carry the straw received upon it upward and outward, finally discharging it over the rear drum 14, the lower part of the carrier remaining beneath the drums. Beneath the carrier is an inclined floor, as at 15, and any grain falling through the carrier is received upon this floor and is delivered into a screw-auger 16, similar to those previously described and by which said grain may be delivered at the side of the machine or to a return-elevator, if it contains unthreshed heads.

17 is a second fan located substantially beneath the lower end of the carrier 13 and adapted to discharge air through this carrier and also between it and the straw-carrier 10, so that as the straw leaves the upper end of the straw-carrier 10 it is lifted and loosened while falling upon the carrier 13, and the blast assists in eventually discharging it over the outer end of this carrier 13.

The fan 17 is so located that it acts both upon the straw passing from the carrier 10 to the carrier 13 and upon the chaff escaping from the cleaning-shoe. Beneath the upper portion of the carrier 13 are a series of pivoted or fulcrumed boards or slats, as shown at 18. These extend transversely across the supporting-frame and stand at an incline with relation to the surface of the carrier, so that the air-blast from the fan 17 may pass freely between these slats when they are fully opened. These slats may be connected in any suitable manner by a rod or otherwise, as at 19, and by means of crank-arms, eccentrics, or similar attachments, as at 20, the slats may be lifted or turned in unison. The relative position of the slats is such that if lifted into a position parallel with the surface of the carrier 13 the openings or spaces between them may be nearly or quite closed. From this point they may be opened downwardly to any desired extent, thus increasing the space through which the air-blast can pass and also assisting by their changed position to give it direction as it passes through. In this manner I am enabled to regulate the strength of the blast to the density of the straw and to keep it lifted and loose upon its carrier, so that all or most of any grain which may remain entangled with it will fall through the spaces between the slats and upon the return-bottom 15, as previously described. The straw passing over the upper end of this carrier will then be discharged to fall upon the back of the machine to the ground, or to a receiver, if such device be employed.

It will be understood that this apparatus is equally applicable to the threshing and separating portion of traveling harvesters or to stationary threshing-machines.

Having thus described my invention, what I claim, and desire to secure by Letters Patent, is—

1. The combination in a threshing-machine of a combined grain and straw carrier, a cleaning-shoe, means for delivering the grain from the upper end of said carrier upon the cleaning-shoe, an inclined straw-carrier located to receive the straw from the first-named carrier, and a blast apparatus discharging through the cleaning-shoe, an inclined supplemental open-slat carrier upon which the second-named straw-carrier discharges, a blast apparatus discharging through said final carrier and between it and the discharge end of the second-named straw-carrier, and inclined transverse slats or direction-boards through which the air-blast passes.

2. The combination with grain and straw carriers, cleaning-shoe and blast apparatus of a threshing-machine, of a supplemental inclined open-slat straw-carrier adapted to receive the straw from the main straw-carrier of the machine and to carry it upwardly and outwardly, a return-bottom located beneath said carrier and an auger-spout into which grain is delivered from said bottom, a blast apparatus adapted to discharge through the supplemental straw-carrier and between its discharge end and the main straw-carrier, slats transversely disposed below the upper part of said supplemental carrier and pivoted and turnable so as to increase or decrease the space between them, and the angle of direction of the belt.

3. The combination with the grain and straw carriers, cleaning-shoe and main blast apparatus of a separator, of a supplemental open-slat endless traveling belt adapted to receive the straw discharged from the main straw-carrier, hinged or pivoted transverse slats located beneath the upper part of said supplemental carrier, a rod or connection uniting the free edges of said slats, and an arm or arms by which the slats may be turned to increase or diminish the space between them and their angular position, an inclined closed bottom located below the carrier and adapted to receive any grain falling therefrom and a blast apparatus, discharging through the carrier and the slats thereof, substantially as described.

4. The combination with the grain and straw carriers main air-blast apparatus and cleaning-shoe of a grain-separator, and an outwardly-inclined tail-board at the rear of the cleaning-shoe, of a supplemental open-slat endless traveling belt adapted to receive the straw discharged from the main straw-carrier, hinged or pivoted transverse slats located beneath the upper part of said supplemental carrier, a rod or connection uniting the edges of said slats and an arm by which the slats may be turned to vary their angle and the space between them, a closed inclined bottom beneath the carrier and a receiving auger-spout, and a supplemental fan located beneath the supplemental carrier and the tail-board, and having a discharge-passage by which the air is so directed as to act upon the chaff as it leaves the tail-board, and the straw passing from the main to the supplemental carrier and over said carrier.

In testimony whereof I have hereunto set my hand in presence of two subscribing witnesses.

WILLIAM V. ALLEN.

Witnesses:
S. H. NOURSE,
F. C. FLIEDNER.